Feb. 5, 1924.
G. A. BUSSE
1,482,674
SPRING REPAIRER
Filed April 23, 1923
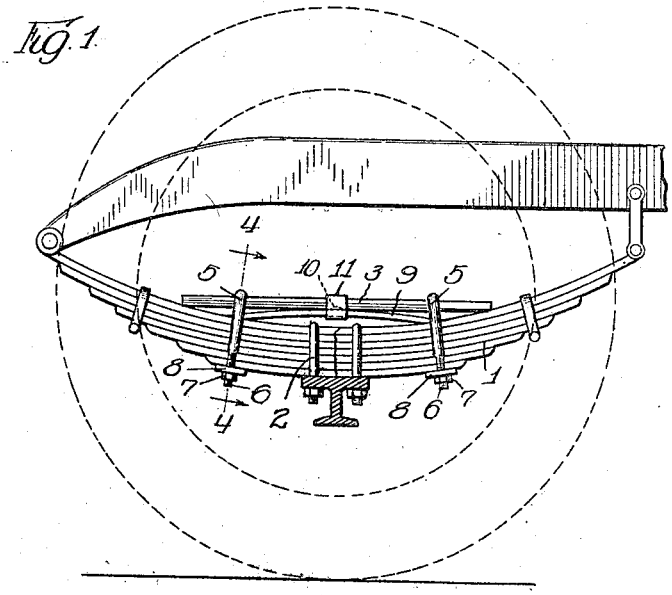
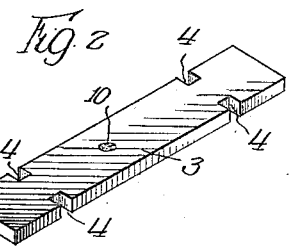
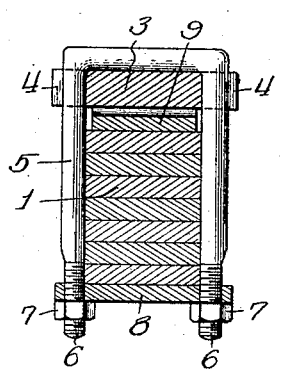
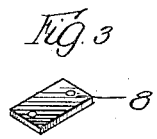
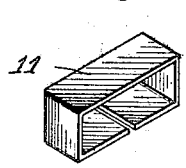
Witness
G. Burkhardt
Inventor
George A. Busse
By Kent W. Wormell attys Patented Feb. 5, 1924.

1,482,674

UNITED STATES PATENT OFFICE.

GEORGE A. BUSSE, OF CHICAGO, ILLINOIS.

SPRING REPAIRER.

Application filed April 23, 1923. Serial No. 633,846.

*To all whom it may concern:*

Be it known that I, GEORGE A. BUSSE, a citizen of the United States, residing at Chicago, in the county of Cook and State of Illinois, have invented certain new and useful Improvements in a Spring Repairer, of which the following is a specification.

This invention relates to an emergency device for repairing a broken or damaged spring, and the principal object of the invention is to provide a simple and easily applied device of this kind which can be applied to a broken or damaged leaf spring of an automobile or another similar vehicle for temporary repairing thereof so that the vehicle can be moved to a place where a new spring can be substituted or suitable permanent repairs made.

In the accompanying drawing, Fig. 1 illustrates a device constructed in accordance with the principles of this invention applied to the broken spring of a vehicle; Fig. 2 is a perspective of a supporting bar used; Fig. 3 is a perspective of the connecting cross piece; Fig. 4 is a sectional view of the device as shown in Fig. 1 and Fig. 5 is a perspective of a fastening clip.

It frequently happens that the spring of an automobile is broken at a considerable distance from a repair shop, and in certain types of spring suspensions the breaking of a spring makes it very difficult and dangerous to drive the vehicle with the spring in this condition. The present invention is intended to provide a temporary repairing connection for a spring in this condition by means of which the spring itself is braced and supported so that it can be used in moving the vehicle, some times for a considerable distance, in order to make permanent repairs.

In carrying out this invention a leaf spring 1 is shown attached at its ends and intermediate its ends in any suitable manner, and the leaves of the spring being connected together by a bolt 2 at the center. The spring or the leaves thereof invariably break at the center thereof, as they are usually weakened by a perforation at this point and if some means is not provided for holding the broken sections of the leaves together, they will fall apart and let down the body of the vehicle with respect to the running gear frame so that it is dangerous, if not impossible, to move the vehicle.

The present invention comprises a strong, sturdy bar 3 of solid metal preferably tool steel or the like which is not easily broken or deflected, somewhat less in length than the spring to which it is applied and usually of sufficient length to extend over the central portion of the leaf spring slightly beyond the shortest leaves thereof. In width this bar 3 is preferably slightly greater than the width of a spring to which it is applied, and adjacent the ends of the bar 3 are opposite notches 4 which provide retaining means for U-shaped bolts or fastening clips 5. These U-shaped bolts have threaded ends 6 and fastening nuts 7 adapted to bear against a cross plate 8 which is placed over the ends after the fastening clips are placed in position so that when the nuts are tightened the plate 8 will bear against the side of the spring opposite that against which the bar 3 is placed.

If desired, a resilient member 9 may be interposed between the leaf spring 1 and the bar 3, and in order to hold this resilient member in place the bar 3 may be formed with a slight depression 10 in one face, and the resilient member with a corresponding raised portion 11 adapted to engage therein. An attaching screw might be inserted through the resilient member 9 into the bar 3, but as this would tend to weaken both the bar and the resilient member, the construction is preferable.

In applying this device to a broken or damaged spring, the body of the vehicle is usually jacked up so that the spring is left free, the bar 3 is placed on one side of the spring depending upon the type of spring to which it is applied, the clips 5 are seated in the notches 4 and the extremities extended at the sides of the spring beyond the opposite edge thereof, the cross pieces 8 are applied over the threaded ends 6 of the clips and the fastening nuts 7 are threaded directly in place. This will draw up the bar 3 firmly against the leaf spring 1 and will bind the central portions of the leaves together holding them tightly in place. The jack may then be removed and the leaf spring and the bar 3 will uphold the vehicle body in the ordinary manner, but with somewhat less resiliency to enable the vehicle to be moved to a place where permanent repairs can be made. If a resilient member 9 is interposed, the function thereof is to hold the bar 3 tightly in engagement with its clips 5.

If desired, a fastening clip or collar 11 may be used for attaching the bar 3 and spring 9 together so that they will not become lost or separated when not in use. It also assists in holding the parts together when in use.

I claim:

1. In a spring repairer of the class described, a stiff metal bar, a clamping device at each end thereof adapted to embrace a spring to which the device is applied, and a resilient member to be interposed between the bar and a spring to which it is applied for holding the bar tightly in connection with the clamping devices under all conditions of the spring.

2. In a spring repairer of the class described, a stiff metal bar, a clamping device at each end of the bar adapted to fit over a spring to which it is applied, a resilient member adapted to be interposed between the bar and a spring to which it is applied, the resilient member and the bar being formed with co-operating engaging parts for preventing the dislocation thereof when applied to a spring.

3. In a spring repairer, a stiff metal bar, a clamping device at each end of the bar to embrace a spring, a resilient member to be interposed between the bar and a spring to which it is applied, and a clip for fastening the bar and resilient member together.

GEORGE A. BUSSE.